March 12, 1940.   J. W. SHEPERDSON   2,193,259
SHEARING APPARATUS
Filed June 5, 1939   7 Sheets-Sheet 1

INVENTOR
JOHN W. SHEPERDSON
BY Albert G. Blodgett
ATTORNEY

March 12, 1940.                J. W. SHEPERDSON                2,193,259
                                SHEARING APPARATUS
                         Filed June 5, 1939        7 Sheets-Sheet 2

INVENTOR
JOHN W. SHEPERDSON
BY Albert G. Blodgett
ATTORNEY

March 12, 1940. J. W. SHEPERDSON 2,193,259
SHEARING APPARATUS
Filed June 5, 1939 7 Sheets-Sheet 3

INVENTOR
JOHN W. SHEPERDSON
BY Albert G. Blodgett
ATTORNEY

March 12, 1940.   J. W. SHEPERDSON   2,193,259
SHEARING APPARATUS
Filed June 5, 1939   7 Sheets-Sheet 5

INVENTOR
JOHN W. SHEPERDSON
BY Albert G. Blodgett
ATTORNEY

March 12, 1940.　　J. W. SHEPERDSON　　2,193,259
SHEARING APPARATUS
Filed June 5, 1939　　7 Sheets-Sheet 6

INVENTOR
JOHN W. SHEPERDSON
BY Albert G. Blodgett
ATTORNEY

Patented Mar. 12, 1940

2,193,259

UNITED STATES PATENT OFFICE 2,193,259

SHEARING APPARATUS

John W. Sheperdson, Worcester, Mass., assignor to Morgan Construction Company, Worcester, Mass., a corporation of Massachusetts Application June 5, 1939, Serial No. 277,409

12 Claims. (Cl. 164—68)

This invention relates to shearing apparatus, and more particularly to so-called "flying shears" adapted to sever longitudinally moving material into predetermined lengths.

While many constructions and arrangements have been proposed for this purpose, there are two general types of flying shears, i. e. the "measuring" type and the "explosion" type. Shears of the measuring type operate continually, and they require some provision for mis-cuts if they are to produce relatively long severed pieces. With this type of shear difficulties are involved in adjusting the shear to produce different lengths of stock while maintaining the necessary close relationship between the speed of the shear knives and that of the stock. A still further problem is presented in bringing the shear blades into the position necessary to produce a front crop of the desired length, for if no special provision is made for this purpose the first piece cut from the stock will be of a random length anywhere between zero and the particular length for which the shear has been adjusted. Shears of the explosion type are stationary between successive cuts, and they are brought into operation suddenly or "explosively" when a cut is to be made. Such shears can be easily controlled to produce severed pieces of any desired length, except for a limitation on the minimum length dependent upon the time required for the shear to complete one cutting cycle. Furthermore it is a relatively simple matter to produce a front crop of the desired length, since the shear is always ready to make a cut upon receipt of a suitable signal, such as an electrical impulse initiated by a flag switch, photo-electric tube, or the like. Consequently, this general type of shear is preferred in many environments to the measuring type.

One common form of explosion type shear is the well-known steam actuated flying shear, which comprises a slidable piston having a piston rod connected thereto. So long as the steam pressure is applied to both sides of the piston, it will remain stationary at one end of its stroke, since the piston has a slightly greater effective area at the side opposite the piston rod than at the side adjacent the piston rod. When a cut is to be made, the steam at the side opposite the piston rod is exhausted to the atmosphere, and the piston will thereupon move with great suddenness. Such shears require large amounts of steam at high pressure, and such a steam supply is not always available. In some plants the steam boilers may be located so far from the shear as to require long and expensive pipe lines to conduct the steam. Consequently, a demand has long existed for an electrically actuated shear of the explosion type, and various attempts have been made to satisfy this demand, but so far as I am aware none of these prior attempts have proven successful. One of the principal problems has been that of obtaining sufficiently rapid acceleration. When an electric motor is stationary, with no current flowing therethrough, an appreciable time is required to establish normal flux density in the motor field and normal current flow in the motor armature, and to bring the motor with its connected shear up to normal operating speed. So much time has been required heretofore for motor acceleration as to render it impossible to make cuts at the intervals necessary for the production of relatively short severed pieces. Furthermore, a long acceleration period tends toward inaccuracy in the length of the pieces cut, not only because the stock speed has more time to change while acceleration is taking place, but also for the reason that a given percentage of variation in the accelerating period will cause a greater change in the lengths of the severed pieces. A further problem has been that of decelerating the motor quickly enough to obtain a relatively short period for the completion of the cycle, and then bringing the motor to a stop when the shear blades have reached a predetermined position. Obviously, if there is a variation in the position at which the blades come to rest, there will be a corresponding variation in the lengths of the severed pieces of stock.

It is accordingly one object of the invention to provide an electrically driven flying shear of the explosion type which will produce predetermined lengths of stock with great accuracy.

It is a further object of the invention to provide an electrically driven flying shear of the explosion type which will accelerate from a position of rest to normal cutting speed in an extremely short interval of time.

It is a further object of the invention to provide an electrically driven flying shear of the explosion type which will always return to a state of rest at exactly the same position after completion of each cutting cycle.

It is a further object of the invention to provide an electrically driven flying shear of the explosion type which will complete each cutting cycle in a comparatively brief time interval and so make it possible to sever the stock into relatively short pieces.

With these and other objects in view, as will be apparent to those skilled in the art, the invention resides in the combination of parts set forth in the specification and covered by the claims appended hereto.

In accordance with my invention in its preferred form I connect an electric motor to a flying shear to drive the same, and I provide a releasable locking mechanism arranged to prevent actuation of the shear and to maintain the shear in a predetermined rest position. In order to obtain extremely rapid acceleration of the shear, sufficient electrical voltage is supplied to the motor, while it is in the rest position, to subject the locking mechanism to a substantial force. Thus when the mechanism is released, the shear will spring into action with great rapidity, in a manner somewhat analogous to an arrow released from a drawn bow. Preferably, as soon as the shear has moved a slight amount, the voltage supplied to the shear motor is increased, and this increase may be made in a series of steps, thus maintaining a relatively heavy current flow through the motor until the shear has reached its full speed and the cut has been completed. Thereupon the shear and motor are rapidly decelerated, preferably by dynamic braking, until the rest position is again reached and the parts are in readiness for the start of the next operating cycle.

Referring to the drawings illustrating one embodiment of the invention and in which like reference numerals indicate like parts, Fig. 1 is a plan view of a flying shear and certain parts associated therewith;

Figure 1:
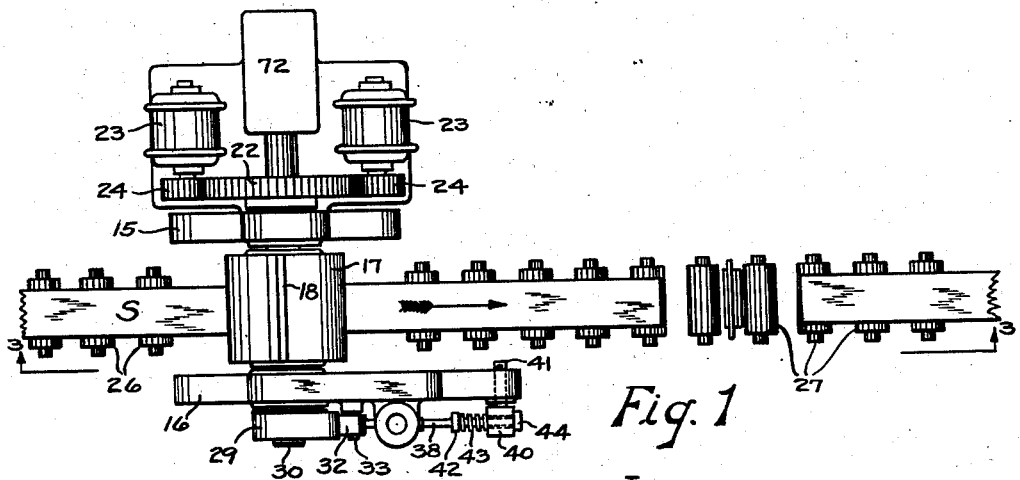

In the drawings I have shown a flying shear comprising a pair of spaced upright housings 15 and 16 (Figs. 1 to 4) which serve to support an upper rotor 17 having a shear knife 18 thereon and a lower rotor 19 having a shear knife 20 thereon. These rotors are arranged to rotate about parallel horizontal axes, and for this purpose they are connected to a pair of inter-meshing gears 22 located adjacent the outer side of the housing 15. Each gear 22 is driven by two electric motors 23 which are connected thereto by means of pinions 24. These motors are shown mounted upon the housing 15. While the entire shear might be driven by a single electrical motor of larger size, there is a decided advantage in utilizing a plurality of relatively small motors, since there is less inertia to be overcome in accelerating the motor armatures, and the motors can be brought up to speed more rapidly. The stock S is delivered to the shear by means of conveyor rollers 26 and travels longitudinally in a generally horizontal direction between the shear rotors 17 and 19 and thence to a series of conveyor rollers 27. The rollers 27 are preferably rotated by any suitable means at a somewhat higher peripheral velocity than the rollers 26, as is customary in apparatus of this type, in order to facilitate the automatic control of the shear in a manner which will be explained hereinafter. The various parts are so arranged that at each rotation of the rotors 17 and 19 the knives 18 and 20 will be brought into proper cutting opposition to sever the stock S transversely without interrupting its longitudinal travel.

Figure 2:
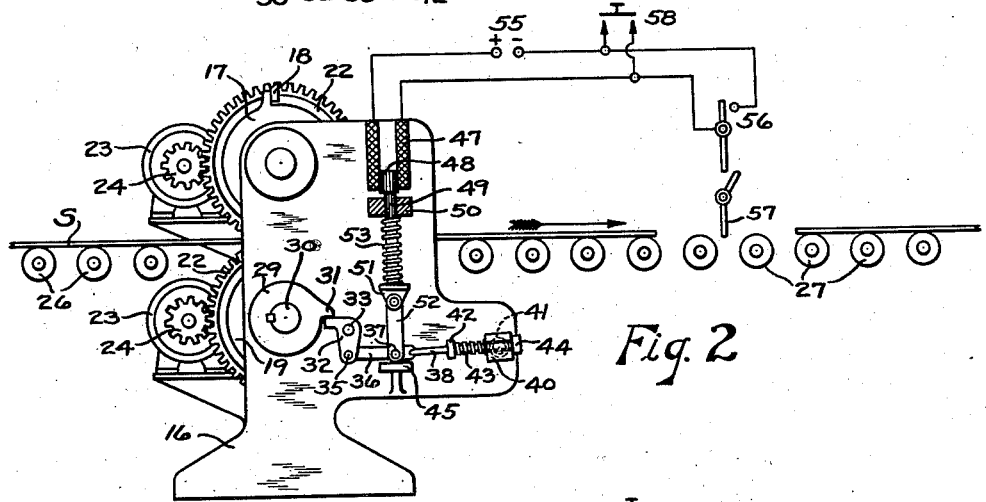
Fig. 2 is a front elevation of the apparatus shown in Fig. 1.
Figure 3:
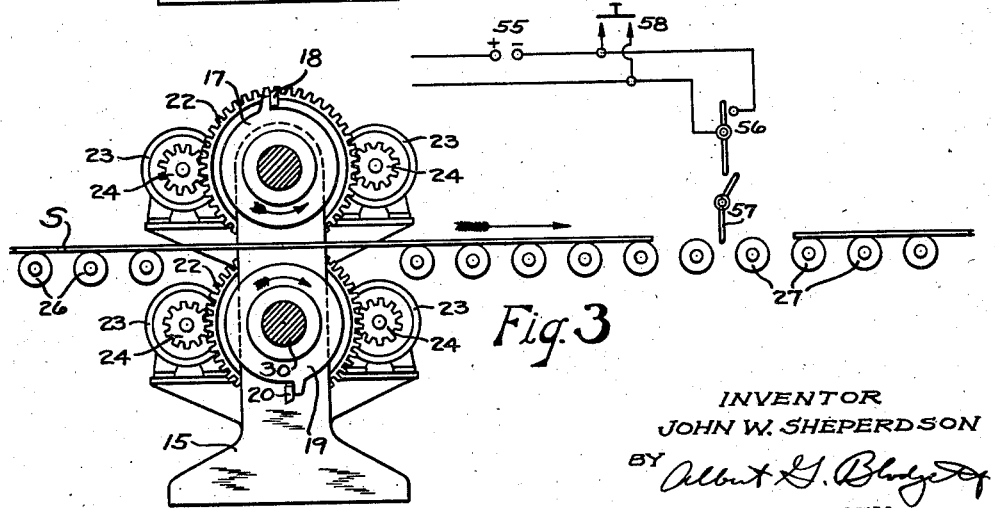
Fig. 3 is a view in section on the line 3—3 of Fig. 1.
Figure 4:
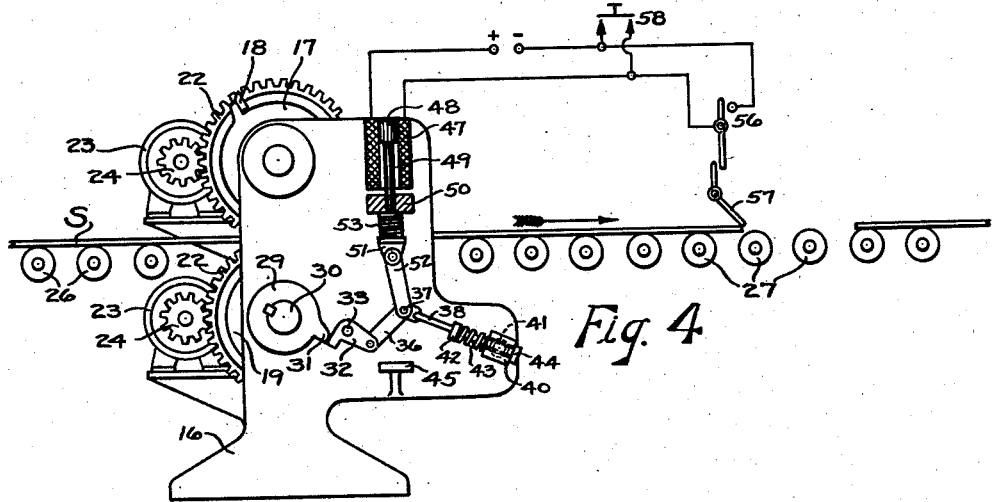
Fig. 4 is a view similar to Fig. 2 but showing the parts in a different phase of the operating cycle.

In accordance with the present invention the shear is brought to rest in a predetermined position after each cut has been completed. In Figs. 1 to 3 the shear is shown in its rest position, with each of the knives 18 and 20 approximately 180 degrees from the point of cutting opposition. In order to hold the various parts stationary in the desired manner until a cut is to be made, a disk 29 is keyed to the shaft 30 of the lower rotor 19, adjacent the outer face of the housing 16. This disk is provided with a radially projecting lug 31 arranged to engage a latch 32 which is pivotally secured to the housing 16 by means of a pin 33. The latch 32 is connected by a pin 35 to one end of a link 36, the other end of the link being connected by a pin 37 to a rod 38 which is slidably supported in a block 40. This block is pivotally secured to the housing 16 by means of a pin 41 (Fig. 1). A shoulder 42 is formed on the rod 38 between the pin 37 and the block 40, and between this shoulder and the block there is provided a heavy coiled compression spring 43 adapted to absorb any shock caused by impact of the lug 31 against the latch 32. A collar 44 is mounted on the outer end of the rod 38 to limit inward sliding movement of the rod. Beneath the pin 37 there is provided a shelf 45, shown integral with the housing 16, and adapted to limit downward movement of this pin. The link 36 and rod 38 form a toggle, and when the shear is at rest, as shown in Fig. 2, the pin 37 is positioned slightly below the line connecting the pins 35 and 41. Thus the toggle is locked in an "over center" position and prevents the latch 32 from being turned about the pin 33 by the pressure of the lug 31.

When a cut is to be made the toggle is released, and for this purpose there is shown a solenoid 47 having a plunger 48 mounted on the upper end of a rod 49 which is slidable vertically in a guide bearing 50 on the housing 16. The lower end of the rod 49 is formed with a lug 51 which is connected to the pin 37 by means of a link 52. Between the lug 51 and the guide bearing 50 there is provided a comparatively light coiled compression spring 53. The solenoid 47 is shown connected to a source 55 of electricity through a normally-open pendulum switch 56 arranged to be actuated by a flag 57 which is located in the path of the stock S delivered by the shear. These parts are so arranged that when the front end of each piece of stock engages the flag 57, the flag will swing and produce a momentary closure of the switch 56, energizing the solenoid 47 for a brief period. This will cause the plunger 48 to move upwardly, "breaking" the toggle 36—38, and releasing the latch 32. As soon as the lug 31 has passed the latch, and the solenoid has been de-energized, the parts will return to their original positions under the influence of gravity and the force of the spring 53. In order to allow manual control of the shear, a normally-open push button 58 is connected in parallel with the switch 56. By varying the location of the flag 57 with respect to the shear, the operator can control the lengths of the pieces cut. It will be apparent that as each piece is severed its velocity will increase under the influence of the conveyor rollers 27, so that a gap will be formed between successive pieces, the flag 57 dropping into each gap as shown in Fig. 2.

When the shear is in its latched or rest position, as shown in Fig. 2 sufficient electric current is supplied to the shear motors 23 to afford a substantial torque and cause the lug 31 to press heavily against the latch 32. Thus when the latch is released the shear will spring into motion with great suddenness, whereupon the voltage supplied to the motors will be increased, preferably in steps, to maintain a high current flow despite the increasing counter E. M. F. (electromotive force) of the motors. In this manner a very high rate of acceleration may be obtained until the shear knives attain their full speed, which takes place before they reach their cutting opposition. Following the completion of each cut, the motors will be decelerated, preferably by dynamic braking, and the lug 31 will again come to rest against the latch 32.

Several arrangements of apparatus may be utilized for obtaining the desired results. In the embodiment illustrated in Fig. 5 there are shown two direct current generators 60 and 61 with a flywheel 62 between them, all driven by a suitable alternating current motor 63 which is supplied with electricity from a source 64. The generator 60 is provided with a field 65 which is connected to a suitable source 66 of direct current. The generator 61 is provided with a field 67 which is connected to the source 66 through an external resistance 68. The shear motors 23 are provided with fields 69 which are connected to the source 66 through an adjustable resistance 70. The generator 60 is arranged to provide the proper voltage for operation of the motors 23 at full speed, while the generator 61 is arranged to serve as a "buck-booster" which, when connected in opposed series relation to the generator 60, will afford a net voltage suitable for application to the shear motors when they are in the rest or latched position.

In order to obtain the required control of the speed of the shear motors, I provide a drum controller 72 which is directly connected to the upper shear rotor 17 and arranged to make one revolution for each shearing cycle. This controller comprises three rotary switches 73, 74 and 75. The switch 73 includes a contact segment 76 and four brushes 77, 78, 79 and 80. The switch 74 includes a contact segment 82 and four brushes 83, 84, 85 and 86. The switch 75 includes a contact segment 88 and two brushes 89 and 90. The motors 23 are shown connected in series group con-series, with one end of this series group connected to the positive terminal of the generator 60 and the other end connected to both the brushes 77 and 83. The brush 86 is connected to the positive terminal of the generator 61, and the brush 80 is connected to the negative terminals of both the generators 60 and 61. The brush 86 is connected through a resistance 91 to the brush 84, and through a portion of the resistance 91 to the brush 85. The brush 80 is connected through a resistance 92 to the brush 78, and through a portion of the resistance 92 to the brush 79. The brushes 89 and 90 are connected to opposite ends of the resistance 68.

Figure 5:
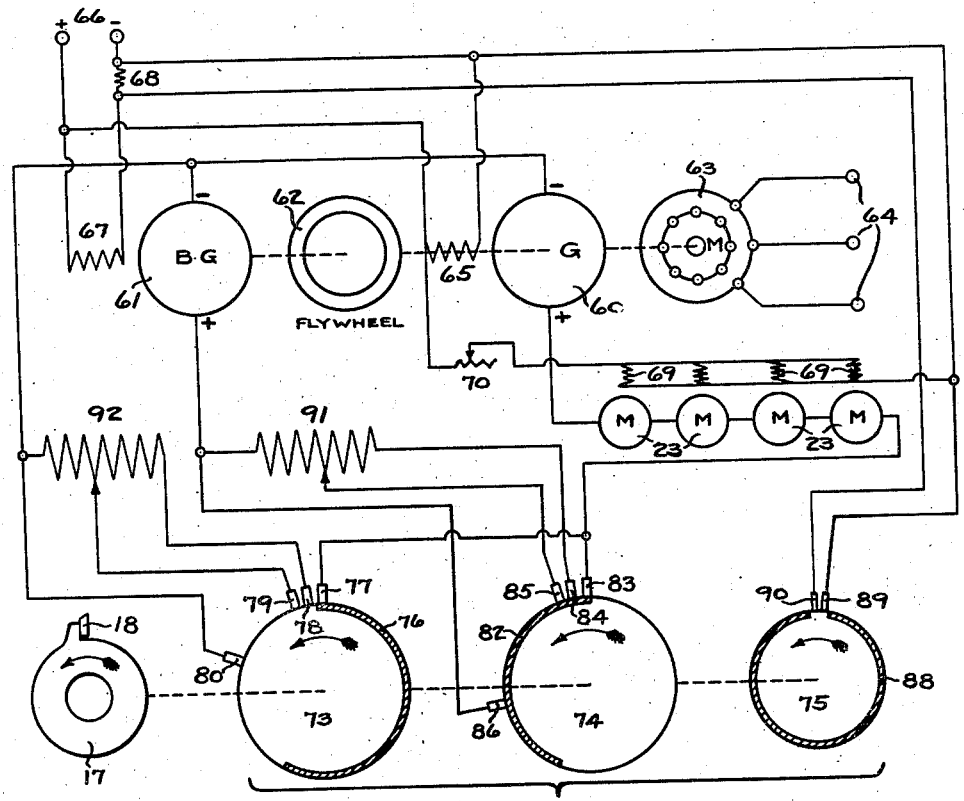
Fig. 5 is an electrical diagram.

The operation of this embodiment will now be apparent from the above disclosure. With the shear in the latched position as shown in Fig. 5, a circuit will be completed from the positive terminal of the generator 60 through the motors 23 to the brush 83, segment 82, brush 86 and thence through the buck-booster generator 61 to the negative terminal of the generator 60. Since the voltages of the generators 60 and 61 are opposed, the net voltage effective on the motors will be the difference between the two generator voltages, and this difference is preferably sufficient to maintain substantially full load current flow through the motors. For example, if the motors require 600 volts to maintain full load current flow when they are operating at full speed and only 50 volts to maintain full load current flow when they are held stationary by the latch, the generator 60 will be constructed to provide 600 volts and the buck-booster generator 61 will be constructed to provide 550 volts, with the resistance 68 in circuit with the field 67. Thus substantially full load current will be flowing through the shear motors and they will be "straining at the leash" as it were, applying substantially full load torque to the shear and creating a heavy pressure against the latch 32. Thus the instant the toggle 36—38 is broken by energization of the solenoid 47, either manually by the push button 58 or automatically by the flag 57 and switch 56, the shear will start. The motor fields are already excited and the motor armatures already carry full load current, so that there is nothing to cause any delay.

Immediately after the shear has started to move, the segment 76 will make contact with the brush 78, sending a substantial part of the motor current through the resistance 92 and thus reducing the current flow through the brush 83. Immediately thereafter the segment 82 will leave the brush 83, but because of the reduced current flow no serious arcing will occur. This will disconnect the buck-booster generator 61 from the circuit, and shortly thereafter the segment 88 will connect the brushes 89 and 90, short-circuiting the resistance 68 and causing the excitation of the field 67 to start building up. Continued rotation of the shear will bring the segment 76 successively into contact with the brushes 79 and 80, cutting out the resistance 92 in steps, and finally applying the full voltage of the generator 60 to the motors 23. The shear will reach its full speed before the knives engage the stock, and this speed will be maintained during the cut and until the knives have cleared the severed stock. Shortly thereafter the segment 82 will make contact with the brushes 83 and 84, and the segment 76 will break its contact with the brush 77. Under these conditions the generators 60 and 61, the resistance 91, and the motors 23 will be connected in a series circuit. The motors at this time will be operating at full speed with a counter E. M. F. of say 550 volts, and the field excitation of the buck-booster generator 61 will have increased (because of the shorting of the resistance 68) until the voltage has reached a value of say 595 volts. Hence the net voltage of the two generators will be only 5 volts, and dynamic braking of the shear motors will take place. As the motors continue to rotate, the segment 82 will make contact with the brush 85 and then the brush 86, cutting out the resistance 91 in steps and reducing the speed of the motors so rapidly that the lug 31 will be brought into contact with the latch 32 without excessive shock, such shock as does occur being absorbed by the spring 43. Shortly before the shear reaches the latched position, the segment 88 will break the circuit between the brushes 89 and 90, thus causing the resistance 68 to be effective to reduce the current flow through the field 67. This will reduce the field excitation of the buck-booster generator, decreasing the generator voltage, and increasing the net voltage applied to the shear motors. However this will require an appreciable time, since field excitation cannot be changed instantaneously and as a result the lug 31 will engage the latch 32 gently and the pressure will thereupon increase until the full torque of the motors is being applied in readiness for the start of the next cutting cycle. Because of the exceedingly rapid acceleration which is made possible by the invention, it is feasible to complete each cutting cycle in a small time interval and to cut relatively short lengths of stock. Furthermore, highly accurate lengths can be cut, provided the stock speed remains reasonably uniform. The flywheel 62 will decrease its speed slightly and give up energy during the acceleration of the shear, and increase its speed slightly and absorb energy during the deceleration of the shear, thereby avoiding excessive speed fluctuations of the motor 63 during the shearing cycle.

Figure 6:
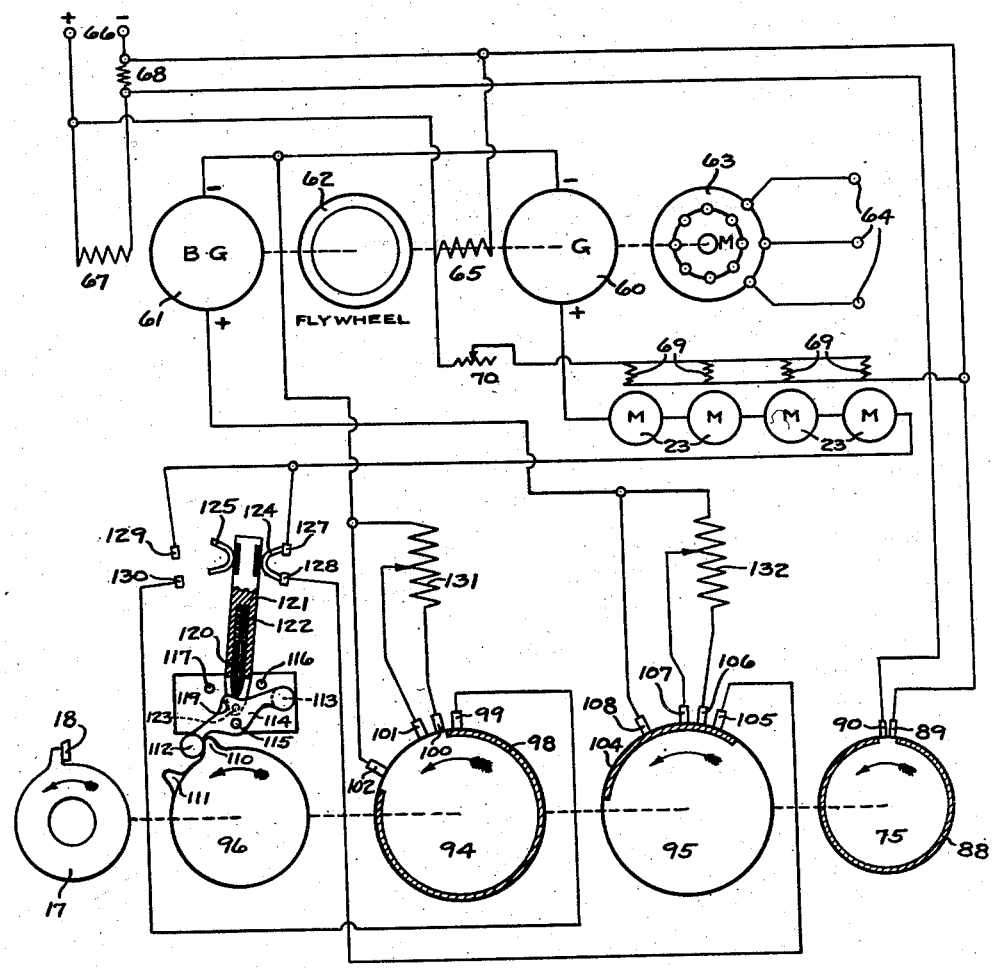
Fig. 6 is a modified electrical diagram.

In Fig. 6 there is shown a modified form of the invention. This embodiment includes two direct current generators 60 and 61 with a flywheel 62 between them, all driven by an alternating current motor 63 supplied with current from a source 64. The generator 60 is provided with a field 65 which is connected to a source 66 of direct current, and the generator 61 is provided with a field 67 which is connected to the source 66 through an external resistance 68. The opposite ends of this resistance 68 are connected to brushes 89 and 90 of a rotary switch 75 having a contact segment 88. The shear motors 23 are provided with fields 69 which are connected to the source 66 through an adjustable resistance 70. As so far described these various parts are the same as in Fig. 5. In Fig. 6 however the rotary switches 73 and 74 of Fig. 5 have been replaced by rotary switches 94 and 95, and by a mechanically actuated snap switch 96, all of which are connected to the upper shear rotor 17 and driven thereby. The switch 94 comprises a contact segment 98 and four brushes 99, 100, 101 and 102. The switch 95 comprises a contact segment 104 and four brushes 105, 106, 107 and 108. The switch 96 comprises a pair of cams 110 and 111 revoluble in different planes and arranged to actuate respectively cam followers 112 and 113 on the opposite ends of a lever 114 which is fulcrumed on a pin 115, the pivotal movement of the lever being limited by stops 116 and 117. The lever 114 is formed with an upwardly projecting cam 119 which engages the lower end of a plunger 120 slidably mounted in a switch arm 121 and urged downwardly by a coiled compression spring 122. The arm 121 is pivotally supported at its lower end by a pin 123, and on its upper end this arm carries two switch members 124 and 125. The member 124 is arranged to connect two contacts 127 and 128 when the arm 121 is at one limit of travel, and the member 125 is arranged to connect two contacts 129 and 130 when the arm is at the other limit of travel. These parts are so arranged that when the cam 110 lifts the follower 112 sufficiently to move the cam 119 slightly beyond the center of the plunger 120, the spring 122 will force the plunger along the inclined-surface of the cam 119 and swing the lever 114 against the stop 117, at the same time throwing the switch arm 121 to the left and bringing member 125 against contacts 129 and 130. Then when cam 111 has reached cam follower 113 and lifted the same sufficiently, the switch arm will return to its original position. One end of the series group of shear motors 23 is connected to the positive terminal of the generator 60, and the other end is connected to both the contacts 127 and 129. The contact 128 is connected to the brush 105, and the contact 130 is connected to the brush 99. The brush 102 is connected to the negative terminals of both the generators 60 and 61, and this brush is also connected through a resistance 131 to the brush 100 and through a portion of the resistance 131 to the brush 101. The brush 108 is connected to the positive terminal of the generator 61, and this brush is also connected through a resistance 132 to the brush 106 and through a portion of the resistance 132 to the brush 107.

The operation of the embodiment shown in Fig. 6 will now be apparent. With the shear in its latched position, a circuit will be completed from the positive terminal of the generator 60 through the motors 23 to the contact 127, switch member 124, contact 128, brush 105, segment 104, brush 108 and thence through the buck-booster generator 61 to the negative terminal of the generator 60. The voltages of the two generators being opposed, the motors 23 will be subjected to the difference in these voltages, which will be sufficient to maintain a heavy torque in the motors. The instant the latch is released, the shear will spring into action, and the cam 110 will immediately lift the cam follower 112 and cause the switch arm 121 to swing to the left very rapidly under the influence of the spring 122. In the meantime the segment 98 will be in contact with the brush 100, so that a circuit will be completed from the positive terminal of the generator 60 through the motors 23, contact 129, switch member 125, contact 130, brush 99, segment 98, brush 100, resistance 131 and thus to the negative terminal of the generator 60. The buck-booster generator 61 will be out of the circuit, and its field excitation will begin to increase due to the action of the segment 88 which will connect the brushes 89 and 90, thereby short-circuiting the resistance 68. As the shear continues to accelerate, the segment 98 will make contact first with the brush 101 and then with the brush 102, thus cutting out all the resistance 131 and applying the full voltage of the generator 60 to the shear motors. After the shear has reached its full speed and completed the cut, the cam 111 will engage the cam follower 113 and cause the switch arm 121 to snap back to the right, into the position shown in the drawings. In the meantime the front portion of the segment 104 will have made contact with the brushes 105 and 106. This will place the generators 60 and 61, the resistance 132, and the motors 23 in a series circuit, causing dynamic braking of the motors and bringing the shear to a stop against the latch. Just before the latch is reached, the segment 88 will break the contact between the brushes 89 and 90, rendering the resistance 68 effective to reduce the field excitation of the buck-booster generator 61, and causing the pressure against the latch to increase until the full torque of the motors is again exerted in readiness for the next cut.

Figure 7:
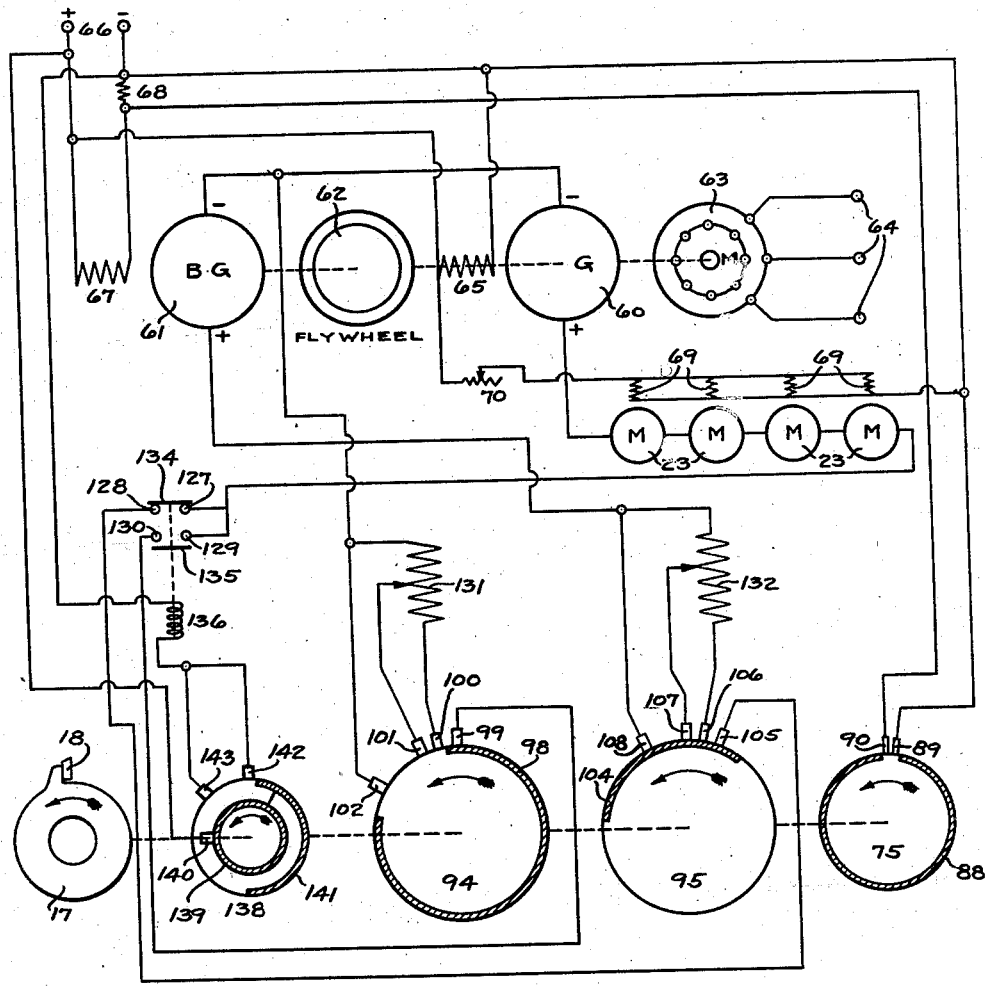
Fig. 7 is a further modified electrical diagram.

In Fig. 7 there is shown a modification which is identical with the embodiment illustrated in Fig. 6 except that the switch members 124 and 125 are respectively replaced by switch members 134 and 135 both of which are controlled by a solenoid 136 instead of the mechanical actuating means shown in Fig. 6. To control the energization of this solenoid there is provided a rotary switch 138 comprising a contact ring 139 having a brush 140 in continuous contact therewith, a contact segment 141 electrically connected to the ring 139, and two brushes 142 and 143 adapted to be engaged by the segment 141. The brushes 142 and 143 are both connected to one terminal of the solenoid 136, the other terminal being connected to one side of the supply 66. The other side of the supply 66 is connected to the brush 140. These parts are so constructed and arranged that when the shear is latched the switch member 134 will connect the contacts 127 and 128, and the motors 23 will be in a series circuit with the generators 60 and 61. Upon release of the latch, the shear will start to move, and the segment 141 will make contact with the brush 142, energizing the solenoid 136 and lifting the switch members 134 and 135. This will have the same effect as the movement of the switch arm 121 in Fig. 6, removing the buck-booster generator 61 from the circuit and causing the shear motors to accelerate under the influence of the generator 60 alone. Upon completion of the cut, the segment 141 will leave the brush 143, de-energizing the solenoid 136 and causing the switch members 134 and 135 to return to their original positions. The shear will then decelerate by dynamic braking and come to rest against the latch.

Figure 8:
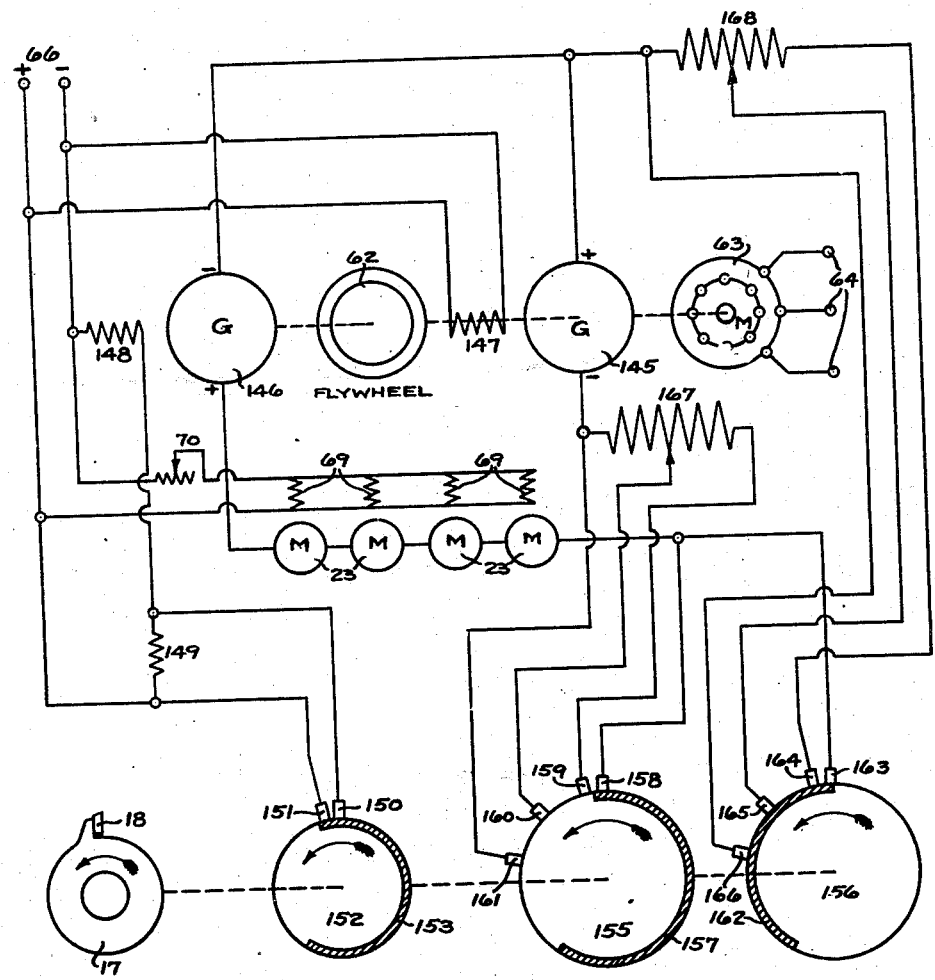
Fig. 8 is a further modified electrical diagram.

In Fig. 8 there is shown a further modification in which the two generators 60 and 61 of the previous embodiments are replaced by two generators 145 and 146 having fields 147 and 148 respectively, the field 148 having a resistance 149 in series therewith. The opposite ends of this resistance 149 are connected to the brushes 150 and 151 of a rotary switch 152 having a contact segment 153. The switch 152 is driven by the upper shear rotor 17, and on the same shaft therewith are two additional rotary switches 155 and 156. The switch 155 comprises a contact segment 157 and four brushes 158, 159, 160 and 161. The switch 156 comprises a contact segment 162 and four brushes 163, 164, 165 and 166. One end of the series group of motors 23 is connected to the positive terminal of the generator 146 and the other end of this group is connected to the brushes 158 and 163. The brush 161 is connected to the negative terminal of the generator 145, and this brush is also connected through a resistance 167 to the brush 159 and through a portion of this resistance to the brush 160. The brush 166 is connected to the positive terminal of the generator 145 and to the negative terminal of the generator 146, and this brush is also connected through a resistance 168 to the brush 164 and through a portion of this resistance to the brush 165. The generator 146 is so constructed that with the resistance 149 short circuited it will produce just sufficient voltage to maintain full load current in the shear motors 23 when the shear is latched. The generator 145 is so constructed that it will produce just sufficient voltage, when added to the voltage of the generator 146, to maintain full load current in the shear motors when they are rotating at full speed. Thus, to use values equivalent to those set forth in connection with the description of Fig. 5, generator 145 may produce 550 volts and generator 146 may produce 50 volts.

In the operation of the embodiment illustrated in Fig. 8, with the shear in the latched position as shown, the shear motors 23 will be supplied with substantially full load current from the generator 146 alone through the brush 163, segment 162 and brush 166. Full motor torque will be applied against the latch, so that when the latch is released the shear will start with the same suddenness as in the previous examples. As soon as the shear has moved a slight distance, the segment 157 will make contact with the brush 159, and the segment 162 will leave the brush 163. This will place the shear motors in a series circuit with both the generators 145 and 146, and the resistance 167. As the shear continues to accelerate, the segment 157 will make contact successively with the brushes 160 and 161, cutting out the resistance 167 in steps until the full 600 volts of the generators in series is applied to the motors. After the shear has reached its full speed and the cut has been completed, the front portion of the segment 162 will make contact with the brushes 163 and 164, and the rear edge of the segment 157 will leave the brush 158. This will place the shear motors in series with the generator 146 and the resistance 168, and since this generator produces only 50 volts, whereas the counter E. M. F. of the motors will be say 550 volts, dynamic braking will occur. Furthermore, as the braking action starts, the rear edge of the segment 153 will leave the brush 150, removing the shunt circuit from the resistance 149, and the field of the generator 146 will start to decay. As the braking action continues, the segment 162 will make contact successively with the brushes 165 and 166, cutting out the resistance 168 in steps. By the time the shear has nearly reached its latched position, the field of the generator 146 will have decayed so far that the generator will produce only a few volts, and the shear will stop against the latch very gently. Just before this happens, the segment 153 will connect the brushes 150 and 151, short circuiting the resistance 149, and causing the field of the generator 146 to build up once more, whereupon the motors 23 will again exert their full torque against the latch in readiness for the next cut.

Figure 9:
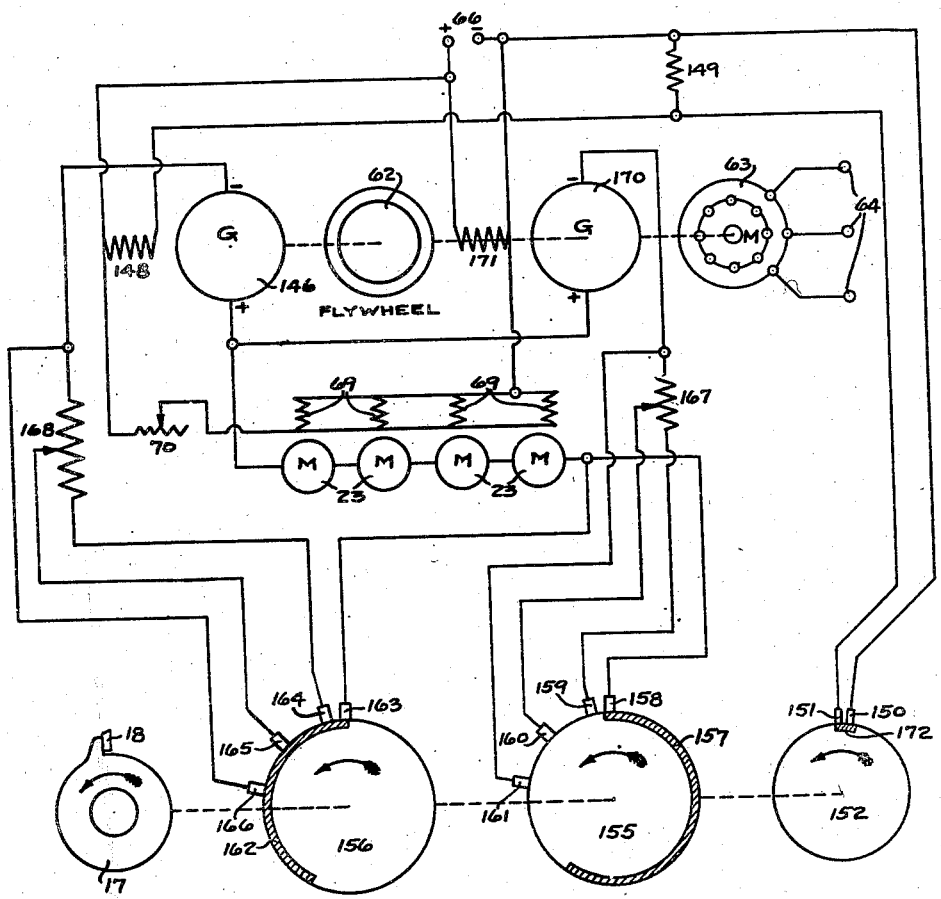
Fig. 9 is a further modified electrical diagram.

In Fig. 9 there is shown a still further modification of the invention. In this embodiment the generator 145 of Fig. 8 is replaced by a generator 170 having a field 171, this generator being arranged to produce the full voltage required by the shear motors 23 at full speed, for example 600 volts, without assistance from the generator 146, the latter being used only during dynamic braking and to maintain the desired motor torque while the shear is latched. The rotary switches 152, 155 and 156 of Fig. 9 are the same as in Fig. 8 except that the contact segment 153 of Fig. 8 has been replaced by a much shorter segment 172. Furthermore certain of the electrical connections are somewhat different. The series group of motors 23 is connected at one end to the positive terminals of both generators 146 and 170, and at the other end to the brushes 158 and 163. The brush 161 is connected to the negative terminal of the generator 170, and the brush 166 is connected to the negative terminal of the generator 146. Thus with the shear in the latched position as shown, the motors 23 will be supplied with substantially full load current from the generator 146 through the brushes 163 and 166, and the segment 162. When the latch is released and the motors start, the segment 157 will make contact with the brushes 158 and 159, and the segment 162 will leave the brush 163. This will connect the motors to the generator 170, through the resistance 167, and the generator 146 will be out of the circuit. At this time the segment 172 will leave the brush 150, rendering the resistance 149 effective to decrease the current flow through the field 148 of the generator 146. During continued acceleration of the motors the resistance 167 will be cut out in steps until the full voltage of the generator 170 is applied to the motors. After the motors have reached full speed and the cut has been completed, the front portion of the segment 162 will make contact with the brushes 163 and 164, and the rear edge of the segment 157 will leave the brush 158. This will place the motors in circuit with the generator 146 through the resistance 168, and as the shear decelerates by reason of the resultant dynamic braking this resistance will be cut out in steps by the action of the segment 162 which will make contact with the brushes 165 and 166 successively. Because of the decaying field of the generator 146, its voltage will be so low as to nearly stop the motors before they reach the latched position, and at this time the segment 172 will connect the brushes 150 and 151, again shunting the resistance 149. The field of the generator 146 will thereupon build up again and cause a gradually increasing pressure against the latch.

Figure 10:
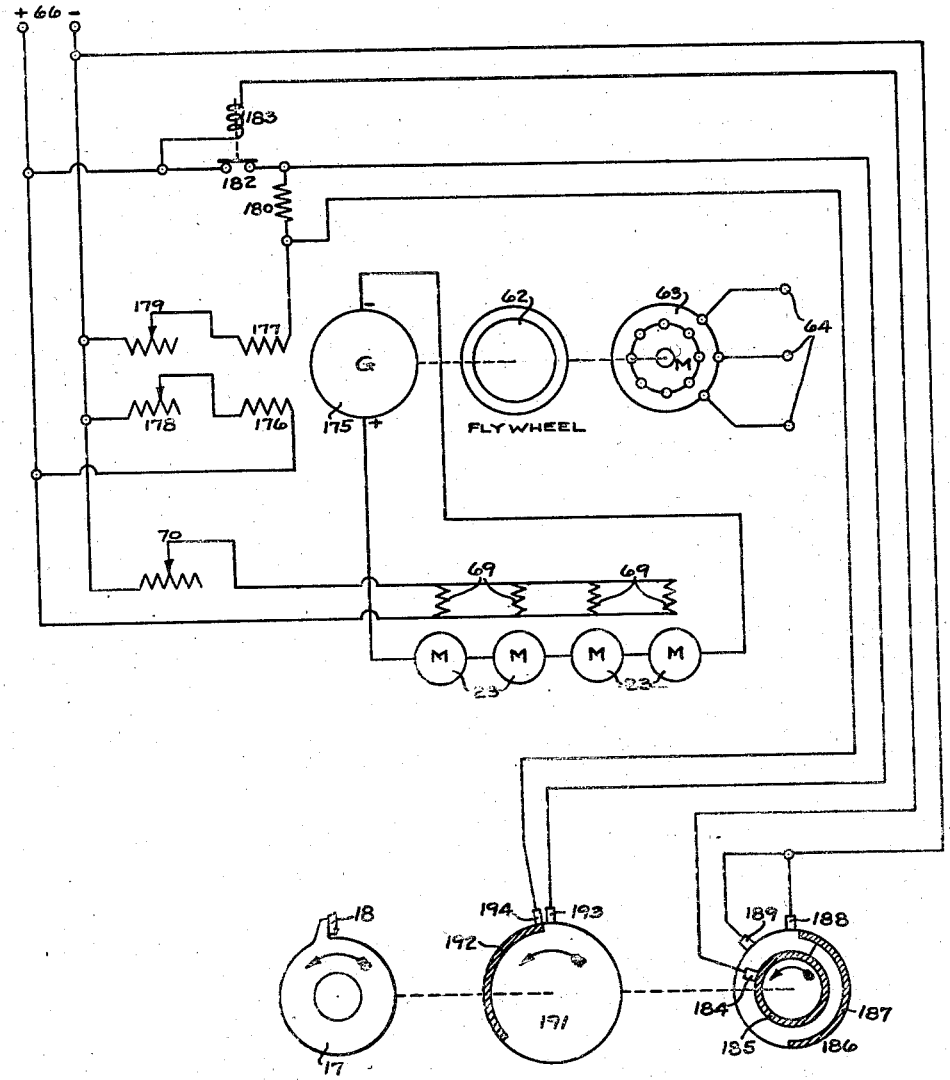
Fig. 10 is a further modified electrical diagram.

In Fig. 10 there is shown a still further embodiment of the invention in which only one generator 175 is used to supply current to the shear motors 23. This generator however has two field windings 176 and 177 which may be provided with separate rheostats 178 and 179 respectively. The field winding 177 is also provided with an additional series resistance 180. These two field windings are opposed, and with the resistance 180 effective and both windings energized the resultant field strength is such that the generator 175 will supply the desired voltage (say 50 volts) for maintenance of substantially full load current in the motors 23 while the shear is in the latched position. With the field winding 176 alone energized, the generator will supply the desired voltage (say 600 volts) for maintenance of substantially full load current in the motors while they are operating at full speed. To control the field winding 177 there is provided in series therewith a normally closed switch 182 arranged to be opened by the energization of a solenoid 183 having one end connected to the positive terminal of the supply 66 and the other end connected to a brush 184 which continuously engages a contact ring 185 on a rotary switch 186. This switch 186 also comprises a contact segment 187 electrically connected to the ring 185, and two brushes 188 and 189 both connected to the negative terminal of the supply 66 and both arranged to be contacted by the segment 187. There is also provided a rotary switch 191 comprising a contact segment 192 and two brushes 193 and 194, these brushes being connected to opposite ends of the resistance 180. The switches 186 and 191 are mechanically connected to the upper rotor 17 of the shear.

The operation of the embodiment shown in Fig. 10 will now be apparent. With the shear in the latched position illustrated, the solenoid 183 will be de-energized, the switch 182 will be closed, and both field windings 176 and 177 will be excited, the resultant field strength being such that the generator 175 will supply say 50 volts to the motors 23, sufficient to maintain substantially full load current and produce a heavy pressure against the latch. Upon release of the latch the shear will start with the same suddenness as in the other embodiments, and as soon as it has moved slightly the segment 187 will make contact with the brush 188, energizing the solenoid 183 and opening the switch 182. This will break the circuit through the field winding 177, and the field strength of the generator will begin to build up, increasing the voltage effective on the shear motors until say 600 volts is being applied. When the motors have reached their full speed and the cut has been completed, the front portion of the segment 192 will make contact with the brushes 193 and 194, shunting the resistance 180. Shortly thereafter the rear edge of the segment 187 will leave the brush 189, de-energizing the solenoid 183 and closing the switch 182. This will energize the field winding 177 and cause the field strength of the generator 175 to decay, lowering the generated voltage and applying dynamic braking to the shear motors 23. Moreover, with the resistance 180 shunted, the field strength may decay nearly to zero, so that the motors may be nearly stopped as the shear approaches its latched position. At this time the rear edge of the segment 192 will leave the brush 193, removing the shunt circuit from the resistance 180. This will reduce the current flow through the field winding 177, and the field strength of the generator 175 will increase until the full torque of the shear motors is being again applied against the latch. While this embodiment may not be quite as well adapted as the other embodiments of the invention for installations requiring the severance of rapidly moving stock into comparatively short lengths, since it involves a change in the field strength of the main generator during each cycle and such a change requires an appreciable time interval, nevertheless it has certain advantages in simplicity, and it includes the feature which is believed to contribute more than any other to the success of the invention. This feature is the provision for maintaining a substantial current flow through the shear motors while they are held stationary by a releasable locking mechanism, whereby a heavy pressure will be applied to the locking mechanism by reason of the motor torque, and the shear will be caused to spring into motion with great suddenness and precision upon release of the mechanism. Thus the time required for acceleration of the shear to full speed can be greatly reduced as compared with prior electrically actuated shears, and the time interval from start to beginning of cut can be maintained uniform on successive cuts, ensuring the production of accurate lengths.

Having thus described my invention, what I claim as new and desire to secure by Letters Patent is:

1. Shearing apparatus comprising a flying shear adapted to sever longitudinally moving stock, an electric motor connected to the shear to drive the same, a releasable locking mechanism arranged to prevent movement of the shear and motor, means to release the locking mechanism, and means to supply electric current to the motor and create a mechanical force which is resisted by said mechanism while in the locked position.

2. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, and means to supply electric current to the motor and create a mechanical torque which is resisted by said mechanism while in the locked position.

3. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, means to supply electric current to the motor at a sufficient voltage to create an appreciable mechanical torque which is resisted by said mechanism while in the locked position, and means to increase the voltage of the current supplied to the motor as the latter starts to move when said mechanism is released.

4. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, means to supply substantially full load electric current to the motor to create substantially full load mechanical torque which is resisted by said mechanism while in the locked position, and means to increase progressively the voltage of the electric current supplied to the motor as the latter starts to move when said mechanism is released and thereby maintain a predetermined heavy current flow through the motor despite the increasing counter E. M. F. of the motor.

5. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, means to supply electric current to the motor at a sufficient voltage to create an appreciable mechanical torque which is resisted by said mechanism while in the locked position, means to increase the voltage of the current supplied to the motor as the latter starts to move when said mechanism is released, means to reduce the voltage of the current supplied to the motor after the shear has completed its cut and thereby decelerate the motor by dynamic braking as the shear approaches the locked position, and means to increase the voltage of the current supplied to the motor as the shear reaches the locked position.

6. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, means to supply electric current to the motor at a sufficient voltage to create an appreciable mechanical torque which is resisted by said mechanism while in the locked position, and control means driven by the motor arranged to increase the voltage supplied to the motor as the latter starts to move when said mechanism is released, the control means also being arranged to reduce the voltage supplied to the motor after the shear has completed its cut, thereby decelerating the motor by dynamic braking, and to increase the voltage supplied to the motor as the shear reaches the locked position.

7. Shearing apparatus comprising a flying shear adapted to sever longitudinally moving stock, an electric motor having a stationary field and a rotatable armature connected to the shear to drive the same, a releasable locking mechanism arranged to prevent movement of the shear and armature, means to release the locking mechanism, means to supply electric current to the field continuously at a substantially constant voltage, means to supply electric current to the armature while the shear is in the locked position at a sufficient voltage to create an appreciable mechanical torque which is resisted by said mechanism, and means to increase the voltage supplied to the armature as the latter starts to move when said mechanism is released.

8. Shearing apparatus comprising a flying shear adapted to sever longitudinally moving stock, a rotary electric motor connected to the shear to drive the same, a releasable latch arranged to prevent movement of the shear and motor, means to supply electric current to the motor and create a mechanical torque which is resisted by the latch, a toggle linkage connected to the latch to actuate the same, said toggle linkage being arranged, when in a slightly overcenter position, to support the latch against the torque applied by the motor, and means to break the toggle linkage and thereby release the latch.

9. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, two electric generators, means to connect said generators in series and thus obtain a voltage differing from the voltage produced by one of the generators alone, and switching apparatus arranged to transmit the lower of said voltages to the motor while said mechanism is in the locked position and to transmit the higher of said voltages to the motor as the motor starts to move upon release of said mechanism.

10. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, two generators one of which is arranged to produce a higher electrical voltage than the other, means to connect the lower voltage generator to the motor while said mechanism is in the locked position, and means to connect the higher voltage generator to the motor as the latter starts to move when said mechanism is released.

11. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, a generator connected to the motor to supply electric current thereto and create a mechanical torque which is resisted by said mechanism while in the locked position, and means to increase the field excitation of the generator as the motor starts to move when said mechanism is released.

12. Shearing apparatus comprising a flying shear adapted to sever longitudinally moving stock, a rotary electric motor connected to the shear to drive the same, a releasable locking mechanism arranged to prevent movement of the shear and motor, means to release the locking mechanism, a generator connected to the motor to supply electric current thereto and create a mechanical torque which is resisted by said mechanism while in the locked position, said generator having two opposing fields, means to supply electric current to both fields, while the mechanism is in the locked position, in such amounts that a comparatively low voltage is produced by the generator, and means to reduce the supply of current to one of the fields as the motor starts to move when said mechanism is released and thereby increase the voltage produced by the generator.

JOHN W. SHEPERDSON.